United States Patent
Choe

(10) Patent No.: US 7,230,448 B2
(45) Date of Patent: Jun. 12, 2007

(54) ON-DRAM TERMINATION RESISTANCE CONTROL CIRCUIT AND METHOD THEREOF

(75) Inventor: Seong-Min Choe, Ichon-shi (KR)

(73) Assignee: Hynix Semiconductor Inc. (KR)

(*) Notice: Subject to any disclaimer, the term of this patent is extended or adjusted under 35 U.S.C. 154(b) by 44 days.

(21) Appl. No.: 10/737,069

(22) Filed: Dec. 15, 2003

(65) Prior Publication Data

US 2004/0217774 A1    Nov. 4, 2004

(30) Foreign Application Priority Data

Apr. 29, 2003    (KR) .................. 10-2003-0026937

(51) Int. Cl.
*H03K 17/16* (2006.01)
(52) U.S. Cl. .................. 326/30; 326/28; 326/34; 327/378; 365/189.05
(58) Field of Classification Search .......... 326/30, 326/31, 34, 28, 83, 86; 327/378, 170; 365/189.05
See application file for complete search history.

(56) References Cited

U.S. PATENT DOCUMENTS 6,064,224 A * 5/2000 Esch et al. .................. 326/30
6,307,791 B1 * 10/2001 Otsuka et al. ............ 365/189.05
6,429,679 B1 * 8/2002 Kim et al. ..................... 326/30
6,535,047 B2 * 3/2003 Mughal et al. .............. 327/378

FOREIGN PATENT DOCUMENTS

KR    10-2004-21110    10/2004

* cited by examiner

*Primary Examiner*—Daniel Chang
(74) *Attorney, Agent, or Firm*—Blakely Sokoloff Taylor & Zafman

(57) ABSTRACT

An on-DRAM termination resistance control circuit is capable of controlling resistance of an IC termination and minimizing area for the resistance control circuit by using a simplified circuit scheme. The on-DRAM termination resistance control circuit includes a push-up resistance adjusting unit, a pull-down resistance adjusting unit and resistance adjustment control unit. The push-up resistance adjusting unit adjusts resistances of a first and a second inner resistors based on an external reference resistor. The pull-down resistance adjusting unit adjusts a resistance of a third resistor based on the second inner resistor that is adjusted by adjustment of the push-up resistance control unit. The resistance adjustment control unit controls to alternatively repeat the operation of the push-up resistance adjusting unit and the pull-down resistance adjusting unit for a predetermined number of adjustment times.

16 Claims, 4 Drawing Sheets

US 7,230,448 B2

ON-DRAM TERMINATION RESISTANCE CONTROL CIRCUIT AND METHOD THEREOF

FIELD OF THE INVENTION

The present invention relates to a resistance control circuit for an IC (Integrated Circuit) termination; and, more particularly, to a resistance control circuit for controlling resistance of an IC termination based on an externally coupled resistor.

BACKGROUND OF THE INVENTION

Generally, a resistor of an IC termination is needed to make signal transmission between devices smooth. When resistances are not matched properly, the transmitted signal may be reflected to cause errors in signal transmission. However, if a fixed resistor is given externally for this matching, resistances cannot be matched properly due to decline of the IC, temperature change, or difference of manufacturing process. For this, a new technique is introduced for controlling the resistance of the IC termination by controlling the number of turned-on transistors among transistors, which are coupled in parallel, to have same resistance as an external reference resistor.

U.S. Pat. No. 6,087,847 issued on Jul. 11, 2000 discloses an IC including a digital feedback control circuit for controlling an impedance of an interface circuit output buffer based on impedance control of non-data signal output buffer that is partially coupled to an external impedance, to suggest a circuit for varying a resistance at an output buffer such as a micro-processor. However, a non-data signal output buffer as shown in FIG. 2 in U.S. Pat. No. 6,087,847 uses an output buffer having same type as an interface circuit output buffer, which has so many logic devices used for impedance control. Therefore, the area for the circuit for controlling the impedance within the IC is to be increased. Further, because U.S. Pat. No. 6,087,847 connects only one of a power voltage and a ground voltage for the output buffer, it cannot be used for resistance control of the termination that is operated by simultaneously turning on switches that is connected to both of the power voltage and the ground voltage.

SUMMARY OF THE INVENTION

It is, therefore, an objective of the present invention to provide a resistance control circuit of an IC termination capable of controlling the resistance of the IC termination and minimizing the area for the resistance control circuit by using a simplified circuit scheme.

In accordance with an aspect of the present invention, there is provided an on-DRAM termination resistance control circuit for adjusting a resistance within a semiconductor memory device that performs an on-DRAM termination operation, including a push-up resistance adjusting unit for adjusting resistances of a first and a second inner resistors based on an external reference resistor; a pull-down resistance adjusting unit for adjusting a resistance of a third resistor based on the second inner resistor that is adjusted by the push-up resistance control unit; and a resistance adjustment control unit for controlling to alternatively repeat the operation of the push-up resistance adjusting unit and the pull-down resistance adjusting unit for a predetermined number of adjustment times.

Desirably, the push-up resistance adjusting unit of the present invention includes a comparing unit for comparing a voltage between both ends of the external reference resistor that is coupled to the first inner resistor with a reference voltage; and a resistance adjusting unit for adjusting the resistances of the first and the second inner resistors depending on the output of the comparing means, and the first and the second inner resistors vary their resistances depending on the output of the resistance adjusting unit.

Desirably, the resistance adjusting unit of the present invention includes a calculating unit for up-counting a signal having predetermined bits by one when receiving the output of the comparing unit; and a first and second push-up decoding unit for adjusting the first and the second inner resistors by decoding the output of the calculating unit, respectively.

Desirably, the pull-down resistance adjusting unit of the present invention includes a comparing unit for comparing the voltage between both ends of the third inner resistor that is coupled to the second inner resistor with a reference voltage; and a resistance adjusting unit for adjusting the resistance of the third inner resistor depending on the output of the comparing unit, and the third inner resistor varies its resistance depending on the output of the resistance adjusting unit.

Desirably, the resistance adjusting unit includes a calculating unit for up-counting a signal of predetermined bits by one when receiving the output of the comparing unit; and a pull-down decoding unit for decoding the output of the calculating unit to adjust the resistance of the third inner resistor.

Desirably, the resistance adjustment controlling unit of the present invention includes a ring oscillator controlling unit for outputting a control signal to start an operation and finish the operation for the predetermined number of times depending on a resistance adjust command from external; a ring oscillator for outputting a pulse at every cycle while oscillating based on the control signal that is outputted from the ring oscillator controlling unit; and a pulse counting and comparing unit for counting the pulses from the ring oscillator and comparing the number of the counted pulses with the predetermined number of times to confirm equality of both numbers.

Desirably, the ring oscillator controlling unit of the present invention includes a first PMOS transistor receiving a power-up signal as its control signal, one end of the first PMOS transistor being coupled to a power voltage; a first NMOS transistor receiving an enable input signal as its control signal, coupled to the other end of the first PMOS transistor and a ground voltage; a first inverter receiving the output of the pulse counting and comparing means as its input; a second PMOS transistor receiving the output of the first inverter as its control signal, coupled to the power voltage and the other end of the first PMOS transistor; a oppositely parallel coupled pair of a second and a third inverters coupled the other end of the first PMOS transistor; and fourth and a fifth inverters, serially coupled to each other, receiving the output of the second inverter as its input.

Desirably, the ring oscillator of the present invention includes a NOR gate receiving the output of the fourth inverter at one of its two inputs; a sixth and a seventh inverters, serially coupled to each other, for buffering the output of the NOR gate; en eighth and a ninth inverters, serially coupled to each other, for buffering the output of the seventh inverter to output to the other input of the NOR gate; and a tenth, an eleventh and a twelfth inverters for buffering and inverting the output of the ninth inverter.

Desirably, the pulse counting and comparing unit of the present invention includes a pulse counter for counting the pulses outputted from the twelfth inverter; and an adjustment times comparing means for comparing the output of the pulse counter with the predetermined number of adjustment.

Also, an on-DRAM termination resistance control method for adjusting a resistance within a semiconductor memory device that performs an on-DRAM termination operation, includes the steps of (a) adjusting resistances of a first and a second inner resistors based on an external reference resistor; (b) adjusting a resistance of a third resistor based on the second inner resistor that is adjusted at the step (a); and (c) alternatively repeating the steps (a) and (b) for a predetermined number of adjustment times.

Desirably, the step (a) of the present invention includes the steps of (d) comparing the voltage between both ends of the external reference resistor coupled to the first inner resistor; and (e) adjusting the resistances of the first and the second inner resistors depending on the comparison result of the step (d).

Desirably, the step (b) of the present invention includes the steps of (f) comparing the voltage between both nds of the third inner resistor coupled with the second inner resistor; and (g) adjusting the resistance of the third inner resistor depending on the comparison result of the step (f).

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Hereinafter, with reference to the accompanying drawings, a preferred embodiment of the present invention will be explained in detail.

Figure 1:
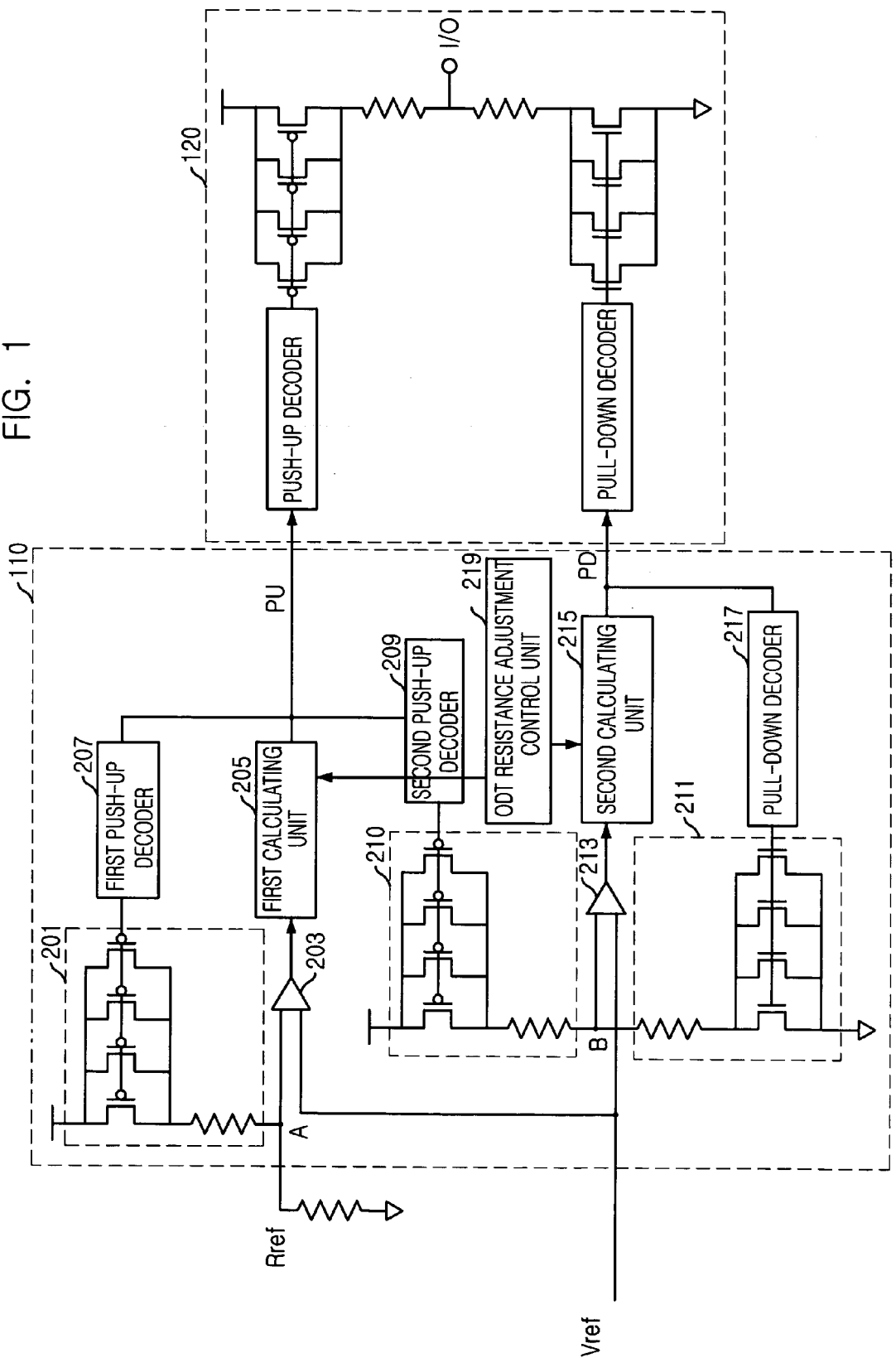
FIG. 1 provides an overall block diagram including an ODT resistance control circuit in accordance with the present invention.

FIG. 1 provides an overall block diagram including an ODT (on-DRAM termination) resistance control circuit in accordance with the present invention.

The ODT resistance control circuit 110 according to the present invention is constructed to respectively provide a PU (push-up) code and a PD (pull-down) code to a push-up decoder and a pull-down decoder of an interface circuit 120 that performs the on-DRAM termination operation.

It will be described in detail for the operation of the ODT resistance control circuit 110 according to an embodiment of the present invention. It may be designed such that 4 of 8 parallel coupled transistors 201, 210, 211 (only 4 shown in FIG. 1) for forming an inner resistor are to be turned on when the ODT resistance control circuit 110 is enabled. At this point, when a first inner resistor 201 varies compared with an external reference resistor Rref, the voltage between both ends of the external reference resistor Rref (i.e., a voltage on a node A) varies in turn. After that, a first comparator 203 compares a reference voltage Vref being half of a power voltage with the voltage on the node A to output a logic signal having one of "H" state and "L" state.

When the outputted logic signal is inputted to a first calculating unit 205, the first calculating unit 205 provides a first push-up decoder 207 and a second push-up decoder 209 with "101" or "011" that is changed from "100" depending on the inputted logic signal. The first push-up decoder 207 and the second push-up decoder 209 adjust the resistances of the first inner resistor 201 and the second inner resistor 210 depending on the input signals. When a voltage on a node B changes depending on the adjusted inner resistor 210, a second comparator 213 receiving the voltage on the node B and the reference voltage Vref as its inputs outputs a logic signal having one of "H" state and "L" state.

When the outputted logic signal is inputted to the second calculating unit 215, the second calculating unit 215 outputs "101" or "011" changed from initial "100" depending on the inputted logic signal so that a pull-down decoder 217 adjust the resistance of the inner resistor 211.

As above, the operation of the push-up resistance adjusting units 201, 203, 205, 207, 209, 210 and the pull-down resistance adjusting units 211, 213, 215, 217 will be stopped by a control signal that is outputted from an ODT resistance adjustment control unit 219 or finished when the resistance of the inner resistor becomes equal to that of the external reference resistor.

That is, an on-DRAM termination resistance control method for adjusting a resistance within a semiconductor memory device that performs an on-DRAM termination operation in accordance with the present invention comprises the steps of (a) adjusting resistances of a first and a second inner resistors based on an external reference resistor, (b) adjusting a resistance of a third resistor based on the second inner resistor that is adjusted at the step (a), and (c) alternatively repeating the steps (a) and (b) for a predetermined number of adjustment times.

Particularly, the step (a) of the present invention includes the steps of (d) comparing the voltage between both ends of the external reference resistor coupled to the first inner resistor with a reference voltage, and (e) adjusting the resistances of the first and the second inner resistors depending on the comparison result of the step (d).

Further, the step (b) of the present invention includes the steps of (f) comparing the voltage between both ends of the third inner resistor coupled to the second inner resistor with a reference voltage, and (g) adjusting the resistance of the third inner resistor depending on the comparison result of the step (f).

Figure 2:
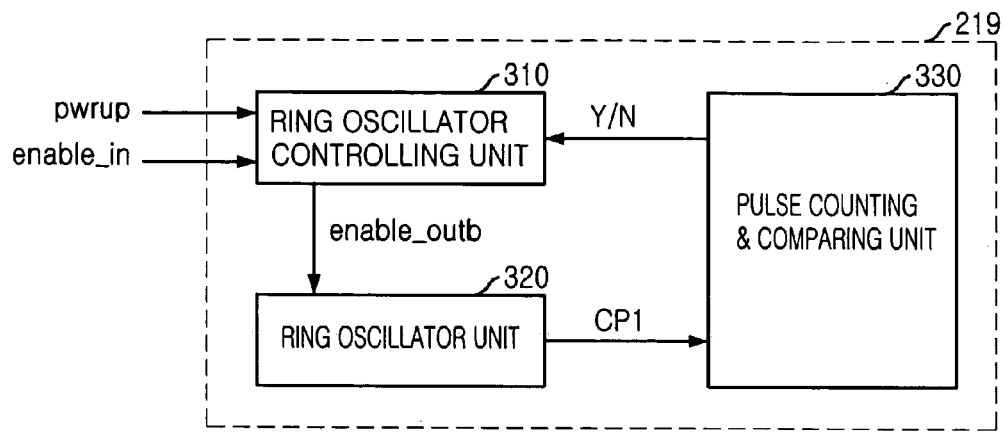
FIG. 2 is a block diagram of an embodiment of an ODT resistance adjustment control circuit in accordance with the present invention.

FIG. 2 is a block diagram of an embodiment an ODT resistance control circuit in accordance with the present invention.

The ODT resistance adjustment control circuit 219 includes a ring oscillator controlling unit 310, a ring oscillator unit 320 and a pulse counting and comparing unit 330. The ring oscillator controlling unit 310 provides the ring oscillator unit 320 with a signal for operating depending on a resistance adjustment command from external. The ring oscillator unit 320 oscillates to output pulses CP1, CP2. The pulse counting and comparing unit 330 counts the number of the pulses CP1 inputted from the ring oscillator unit 320, i.e., the number of times of actual resistance adjustment operations and then compare it with the number of commanded adjustment times to provide comparison result to the ring oscillator controlling unit 310. The ring oscillator controlling unit 310 determines whether to continue the operation or to finish depending on the comparison result. That is, when the number of times of actual resistance adjustment operations reaches the number of commanded adjustment times, the ring oscillator controlling unit 310 provides a signal for stopping the operation to the ring oscillator unit 320 so that the ring oscillator unit 320 finishes its operation.

Figure 3:
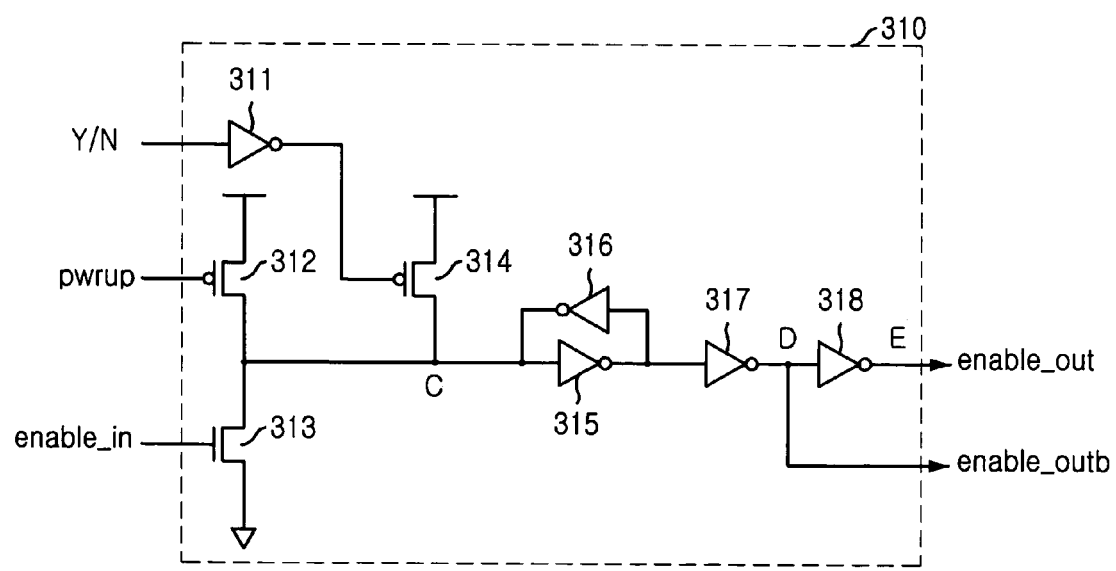
FIG. 3 describes an embodiment of a ring oscillator control unit in accordance with the present invention.
Figure 4:
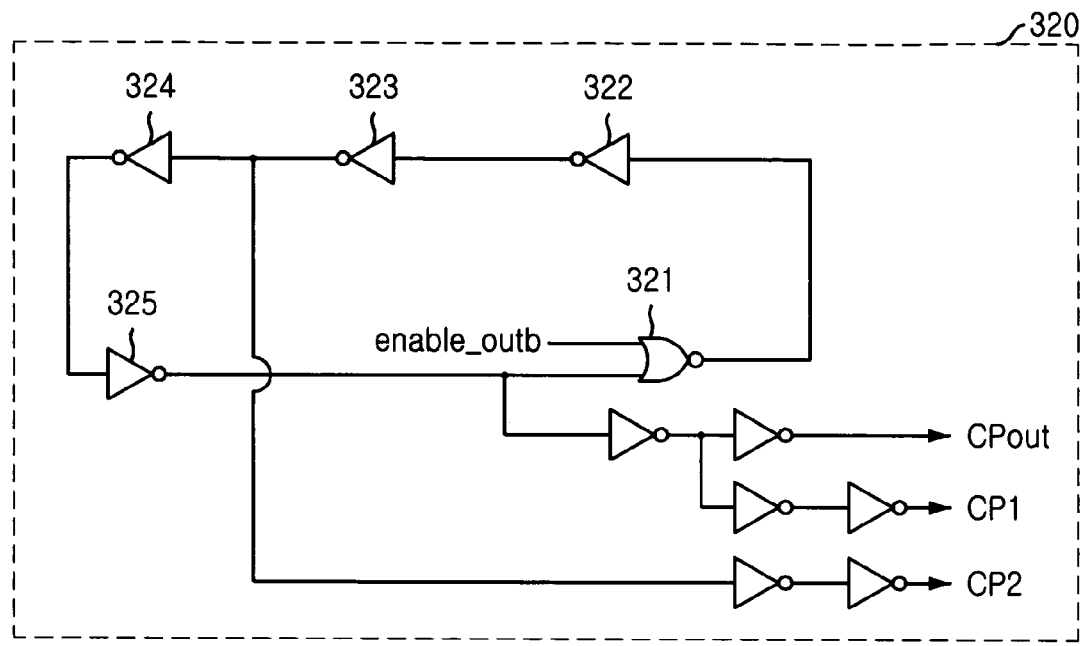
FIG. 4 shows an embodiment of a ring oscillator unit in accordance with the present invention.
Figure 5:
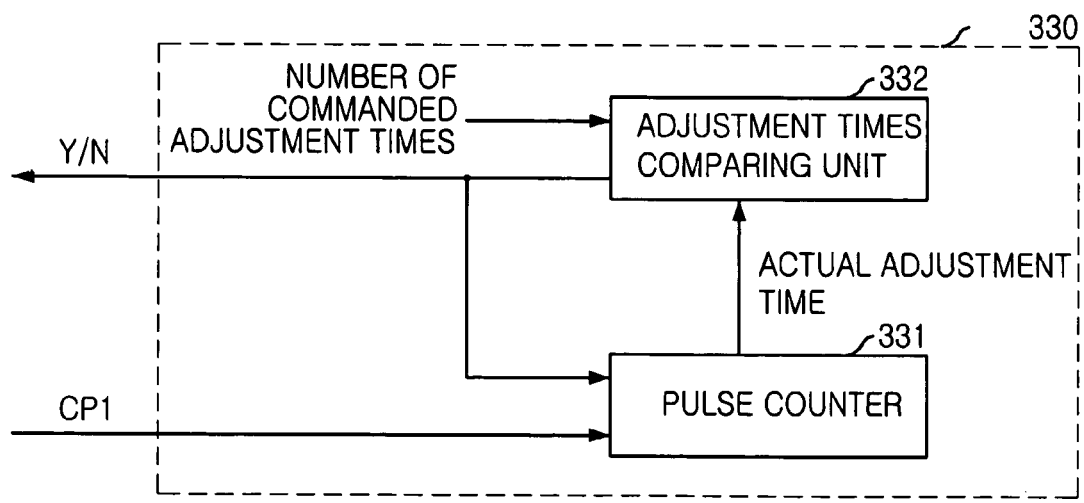
FIG. 5 presents an embodiment of a pulse counting and comparing circuit in accordance with the present invention.

FIG. 3 describes an embodiment of a ring oscillator control unit in accordance with the present invention, FIG. 4 shows an embodiment of a ring oscillator unit in accordance with the present invention, and FIG. 5 presents an embodiment of a pulse counting and comparing unit in accordance with the present invention.

It will be described for signals that are inputted to FIG. 3. A signal Y/N keeps its state in Y ("H" state) if the number of times of actual adjustment operations is equal to the number of commanded adjustment times and, if else, it keeps its state in N ("L" state). A power-up signal pwrup keeps its state in "H" when power is turned on. An enable input signal enable_in keeps its state in "H" when the operation of the ODT resistance adjustment controlling unit 219 is enabled.

Using the above signals as its inputs, when the enable input signal enable_in of the ring oscillator controlling unit in FIG. 3 transits to "H" state, there are subsequent transits to "L" state on a node C, to "L" state on a node D, and to "H" state on a node E. Finally, An enable output bar signal enable_outb outputs "L" state.

When the enable output bar signal enable_outb of "L" state is inputted to a NOR gate 321 in FIG. 4, an F node and the pulse CP2 transit to "H" state and the pulse CP1 outputs "L" state with a delay from the pulse CP2 by a predetermined delay time.

After performing such an operation for the predetermined commanded adjustment times, when the signal Y/N from the pulse counting and comparing unit 330 transits to "H", a PMOS transistor 314 is turned on to make an H node have "H" state. Accordingly, the enable output bar enable_outb transits to "H" state. When the enable output bar signal enable_outb of "H" state is inputted to the NOR gate 321, the F node and the pulse CP2 transit to "L" state and the pulse CP1 outputs "H" state with a delay from the pulse CP2 by predetermined delay time.

Briefly describing for FIG. 5, a pulse counter 331 counts the pulses CP1 inputted from the ring oscillator unit 320. An adjustment times comparing unit 332 compares the number of the actual adjustment times with the number of the commanded adjustment times to output a signal having "H" when two numbers are equal to each other. At this time, the pulse counter 331 uses the signal of "H" state when two numbers are equal to each other as a reset signal to reset the pulse counter 331.

Figure 6:
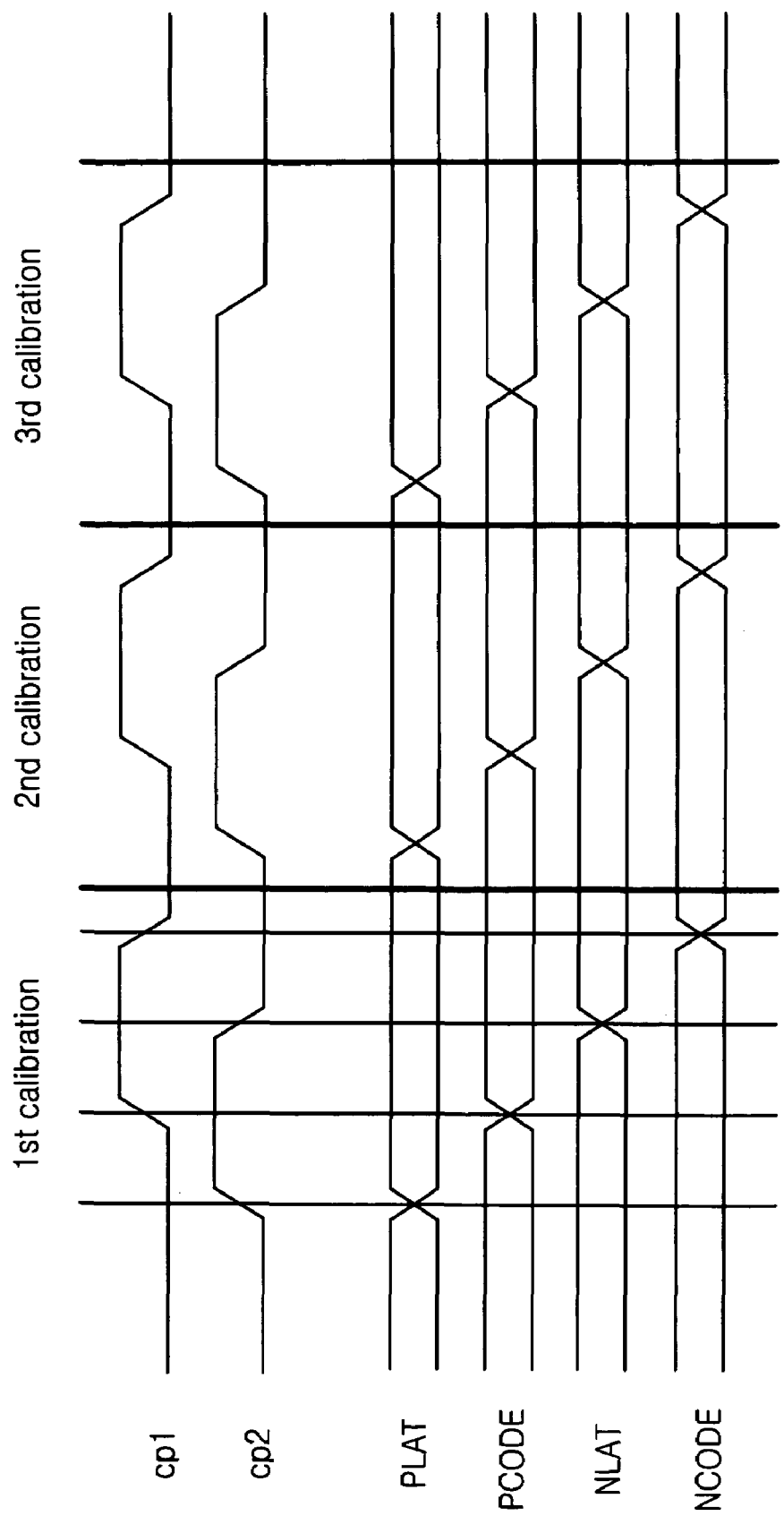
FIG. 6 illustrates a timing diagram of an ODT resistance control circuit in accordance with an embodiment of the present invention.

FIG. 6 illustrates a timing diagram of an ODT resistance control circuit in accordance with an embodiment of the present invention.

In an embodiment, there are provided 4 operations that are performed by using rising edge triggering and falling edge triggering of the pulses CP1, CP2.

As described above, according to the present invention, the IC termination resistance control circuit and the method thereof can adjust the termination resistance in the IC and minimize the area of the circuit with the simplified circuit scheme.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An on-DRAM termination resistance control circuit for adjusting a resistance within a semiconductor memory device that performs an on-DRAM termination operation, comprising:
   push-up resistance adjusting means for adjusting resistances of a first inner resistor and a second inner resistor based on an external reference resistor;
   pull-down resistance adjusting means for adjusting a resistance of a third inner resistor based on the second inner resistor that is adjusted by the push-up resistance adjusting means; and
   resistance adjustment control means for controlling the operations of the push-up resistance adjusting means and the pull-down resistance adjusting means for a predetermined commanded adjustment time,
   wherein the resistance adjustment control means includes a ring oscillator controlling means for outputting a control signal to start an operation and finish the operation for the predetermined commanded adjustment time depending on an external resistance adjust command.

2. The on-DRAM termination resistance control circuit as recited in claim 1, wherein the push-up resistance adjusting means includes:
   comparing means for comparing the voltage between both ends of the external reference resistor that is coupled to the first inner resistor with a reference voltage; and
   resistance adjusting means for adjusting the resistances of the first and the second inner resistors depending on the output of the comparing means, and
   wherein the first and the second inner resistors vary resistances thereof depending on the output of the resistance adjusting means.

3. The on-DRAM termination resistance control circuit as recited in claim 2, wherein the resistance adjusting means includes:
   calculating means for up-counting a signal having predetermined bits by one when receiving the output of the comparing means; and
   first and second push-up decoding means for adjusting the first and the second inner resistors by decoding the output of the calculating means, respectively.

4. The on-DRAM termination resistance control circuit as recited in claim 3, wherein the first and the second inner resistors are formed by a plurality of parallel coupled PMOS transistors, respectively.

5. The on-DRAM termination resistance control circuit as recited in claim 1, wherein the pull-down resistance adjusting means includes:
   comparing means for comparing the voltage between both ends of the third inner resistor that is coupled to the second inner resistor with a reference voltage; and
   resistance adjusting means for adjusting the resistance of the third inner resistor depending on the output of the comparing means, and wherein the third inner resistor varies the resistance thereof depending on the output of the resistance adjusting means.

6. The on-DRAM termination resistance control circuit as recited in claim 5, wherein the resistance adjusting means includes:
    calculating means for up-counting a signal having predetermined bits by one when receiving the output of the comparing means; and
    pull-down decoding means for decoding the output of the calculating means to adjust the resistance of the third inner resistor.

7. The on-DRAM termination resistance control circuit as recited in claim 6, wherein the third inner resistor is formed by a plurality of parallel coupled NMOS transistors.

8. The on-DRAM termination resistance control circuit as recited in claim 1, wherein the resistance adjustment controlling means further includes:
    ring oscillator for outputting a pulse at every cycle while oscillating based on the control signal from the ring oscillator controlling means; and
    pulse counting and comparing means for counting the pulses from the ring oscillator and comparing the number of the counted pulses with the predetermined commanded adjustment time to confirm equality of both numbers.

9. The on-DRAM termination resistance control circuit as recited in claim 8, wherein the ring oscillator controlling means includes:
    a first PMOS transistor receiving a power-up signal as a control signal thereof, one end of the first PMOS transistor being coupled to a power voltage;
    a first NMOS transistor receiving an enable input signal as a control signal thereof, coupled to the other end of the first PMOS transistor and a ground voltage;
    a first inverter receiving the output of the pulse counting and comparing means as an input thereof;
    a second PMOS transistor receiving the output of the first inverter as a control signal thereof, coupled to the power voltage and the other end of the first PMOS transistor;
    an oppositely parallel coupled pair of a second and a third inverters coupled the other end of the first PMOS transistor; and
    a fourth and a fifth inverters, serially coupled to each other, receiving the output of the second inverter as an input thereof.

10. The on-DRAM termination resistance control circuit as recited in claim 9, wherein the ring oscillator includes:
    a NOR gate receiving the output of the fourth inverter at one of two inputs thereof;
    a sixth and a seventh inverters, serially coupled to each other, for buffering the output of the NOR gate;
    an eighth and a ninth inverters, serially coupled to each other, for buffering the output of the seventh inverter to output to the other input of the NOR gate; and
    a tenth, an eleventh and a twelfth inverters for buffering and inverting the output of the ninth inverter.

11. The on-DRAM termination resistance control circuit as recited in claim 10, wherein the pulse counting and comparing means includes:
    a pulse counter for counting the pulses that are outputted from the twelfth inverter; and
    adjustment times comparing means for comparing the output of the pulse counter with the predetermined number of adjustment times.

12. An on-DRAM termination resistance control method for adjusting resistance within a semiconductor memory device that performs an on-DRAM termination operation, comprising the steps of:
    (a) adjusting resistances of a first inner resistor and a second inner resistor based on an external reference resistor;
    (b) adjusting a resistance of a third inner resistor based on the second inner resistor that is adjusted at the step (a); and
    (c) controlling the steps (a) and (b) for a predetermined commanded adjustment time by generating a control signal to start an operation and finish the operation for the predetermined commanded adjustment time depending on an external resistance adjust command and outputting a pulse at every cycle while oscillating based on the control signal.

13. The on-DRAM termination resistance control method as recited in claim 12, wherein the step (a) includes the steps of:
    (d) comparing the voltage between both ends of the external reference resistor coupled to the first inner resistor with a reference voltage; and
    (e) adjusting the resistances of the first and the second inner resistors depending on the comparison result of the step (d).

14. The on-DRAM termination resistance control method as recited in claim 13, wherein the step (b) includes steps of:
    (f) comparing the voltage between both ends of the third inner resistor coupled to the second inner resistor with the reference voltage; and
    (g) adjusting the resistance of the third inner resistor depending on the comparison result of the step (f).

15. The on-DRAM termination resistance control method as recited in claim 14, wherein the step (c) further includes:
    counting the pulses and comparing the number of the counted pulses with the predetermined commanded adjustment time to confirm equality of both numbers.

16. The on-DRAM termination resistance control method as recited in claim 15, wherein the push-up code and the pull-down code are used for performing an on-DRAM termination operation.

* * * * *